Oct. 3, 1967  O. O. LONGMAN  3,344,830
SUGAR CANE PLANTER
Filed Sept. 9, 1965  5 Sheets-Sheet 1
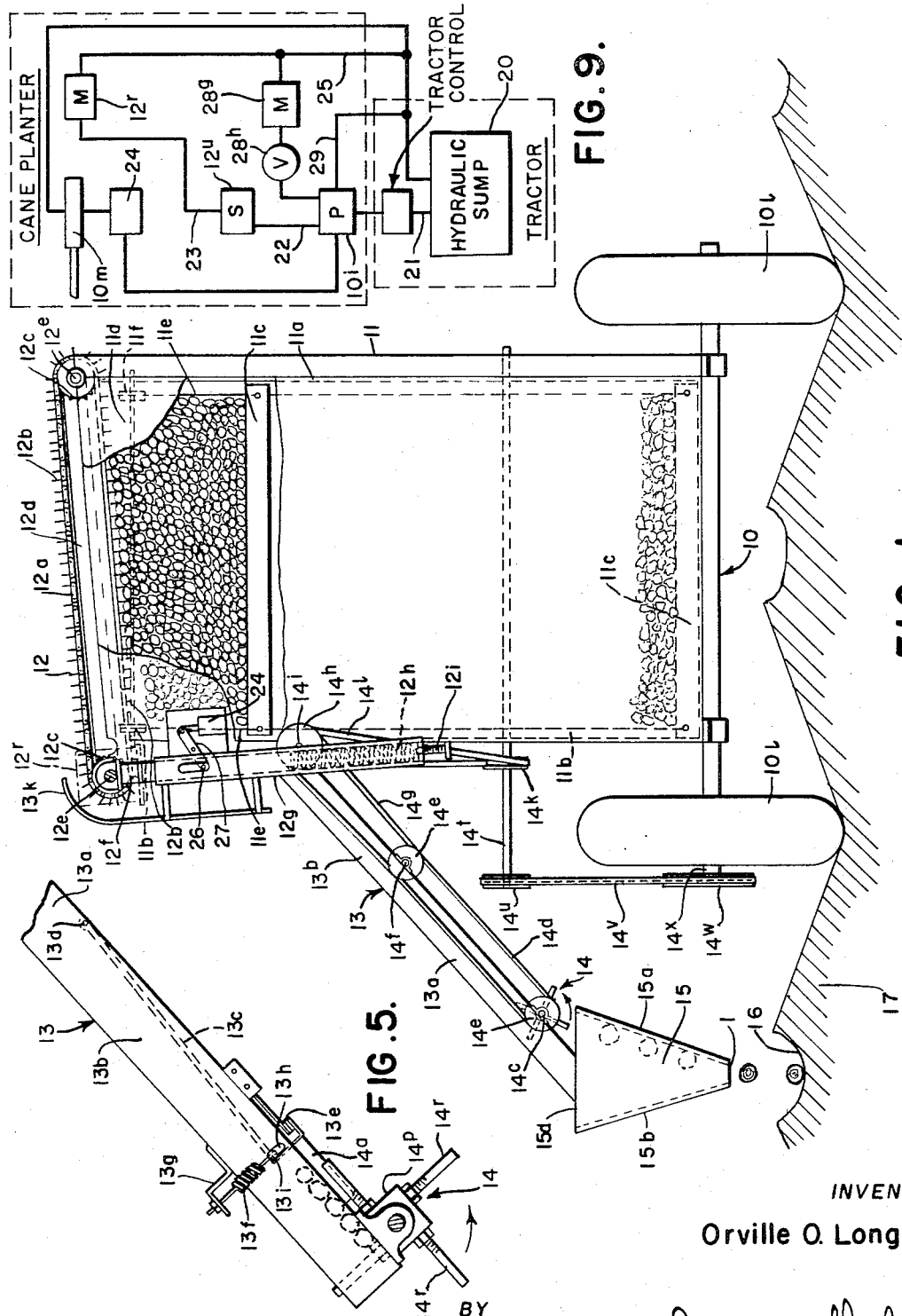
INVENTOR
Orville O. Longman
BY Wilkinson, Mawhinney & Theibault
ATTORNEYS

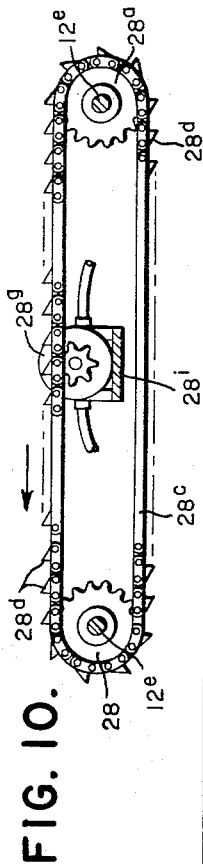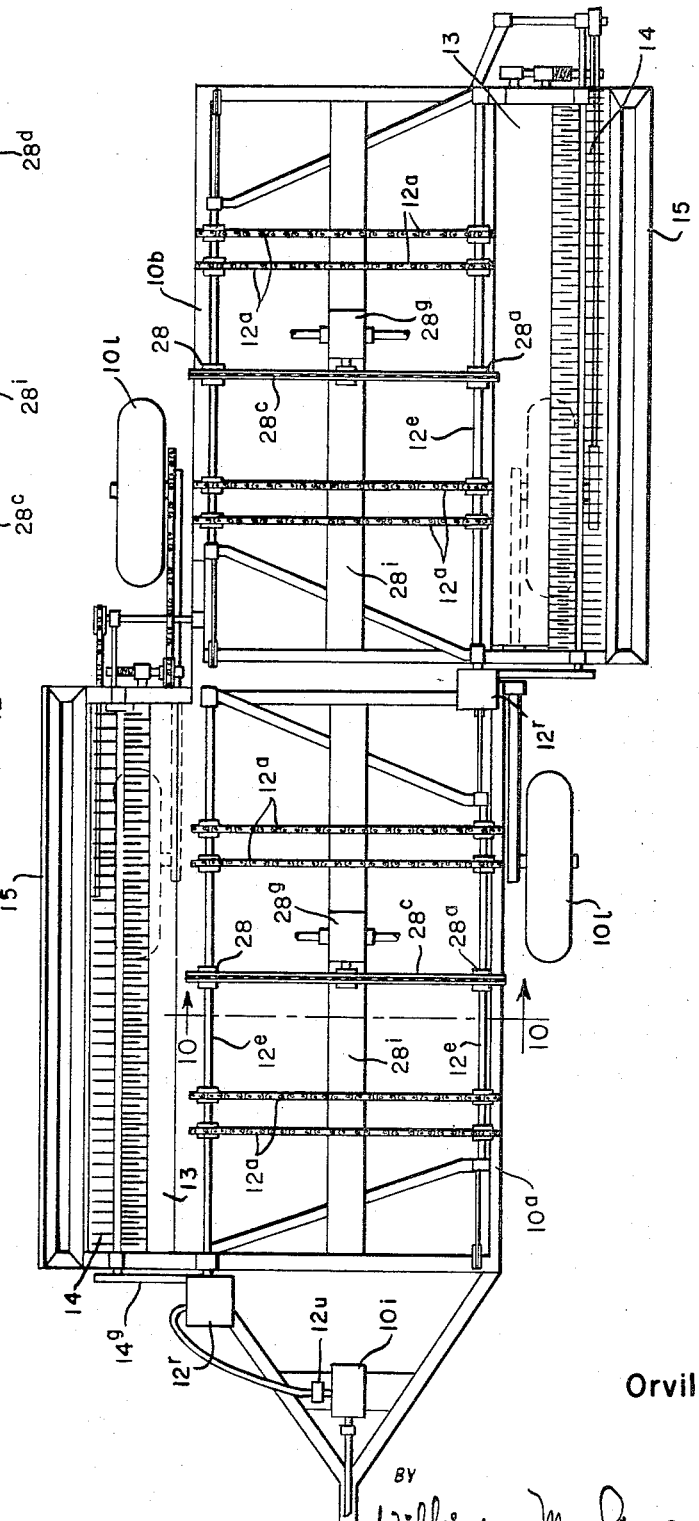

INVENTOR
Orville O. Longman

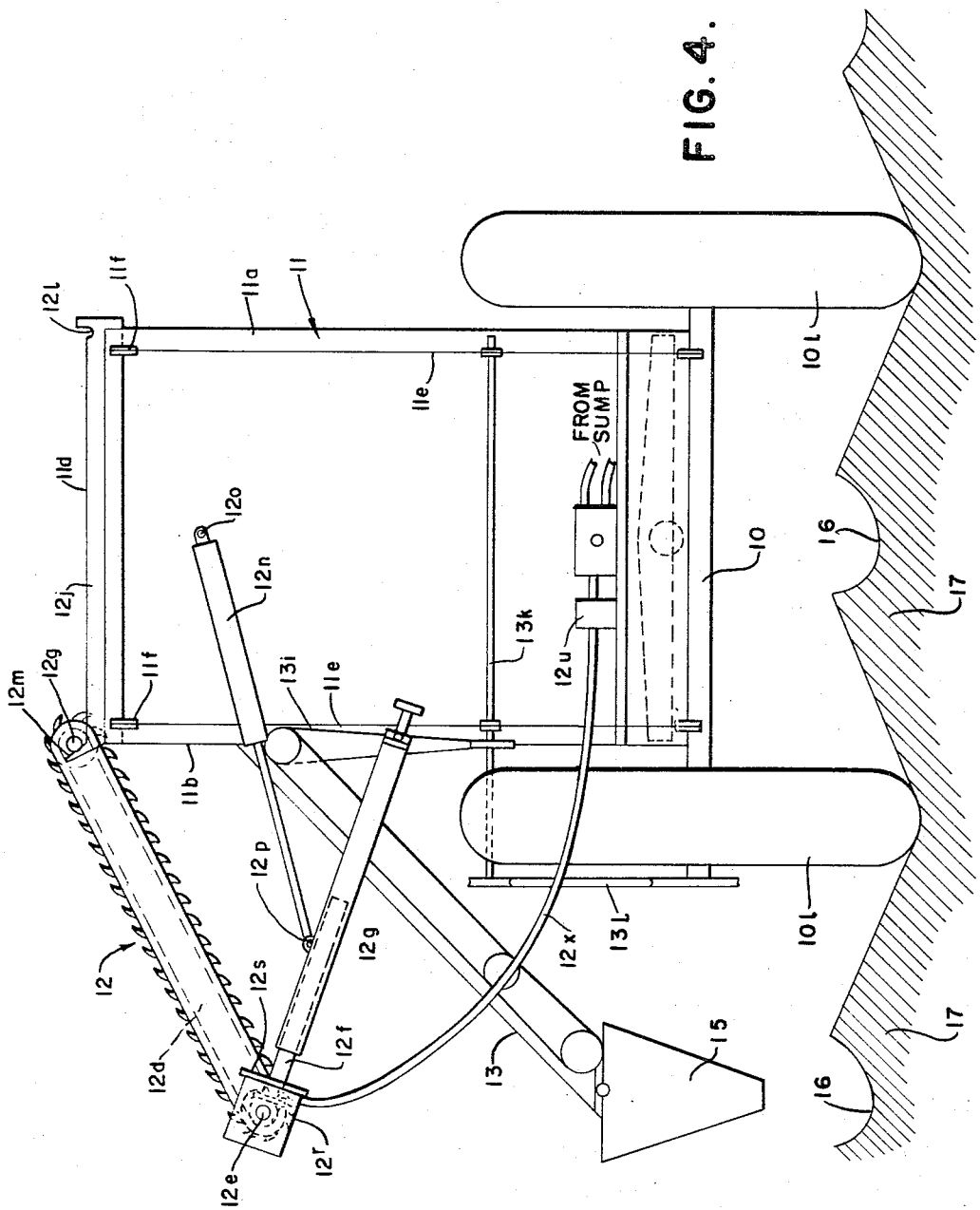

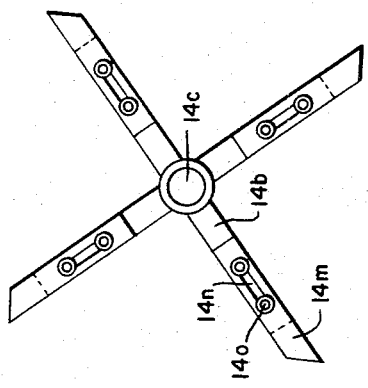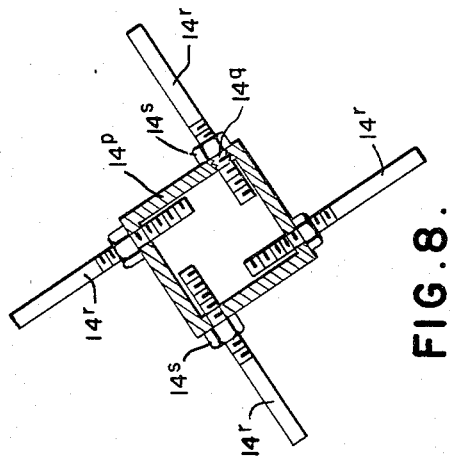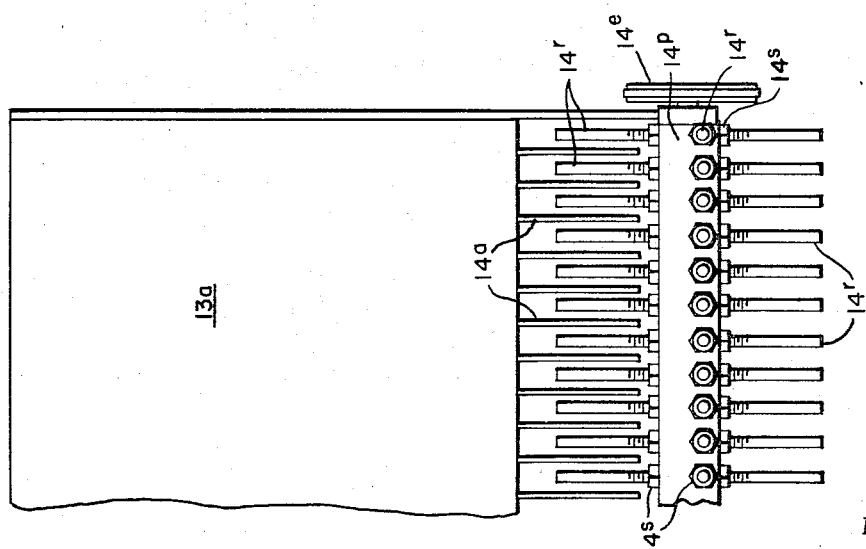

United States Patent Office 3,344,830
Patented Oct. 3, 1967

3,344,830
SUGAR CANE PLANTER
Orville O. Longman, P.O. Box 242, Baldwin, La. 70514
Filed Sept. 9, 1965, Ser. No. 486,083
11 Claims. (Cl. 146—129)

The present invention relates to sugar cane planter, and has for an object to provide a vehicle which may be drawn along previously prepared cane rows for planting sugar cane stalks therein. The prior preparation includes the opening of the top of a cane row to receive sugar cane stalks which are deposited in the open portion of the top of the cane row with the longitudinal axis of the cane stalks running along the axis of the cane row. This vehicular frame is adapted to be pulled along the sugar cane rows by a prime mover which may be a tractor having a power take-off for driving the hydraulic control unit for supplying power to the planter. The mobile vehicular frame of the planter is provided with a container for receiving sugar cane stalks placed therein with the longitudinal axis of the cane stalk substantially parallel to the axis of the cane row. The container has an elevatable bottom whereby as the cane stalks are laterally transferred from the top of the container the bottom is elevated to maintain a supply of cane stalks in transfer contact with a lateral cane transfer means which laterally displaces from the top of the container sugar cane stalks which fall by gravity upon a planting apron, which apron is disposed at an angle to the ground at one side of the planter such that the sugar cane stalks will slide down the planting apron and be gravitationally biased to a cane dispensing metering device which will dispense any predetermined number of cane stalks the planter operator desires to deposit into the plant row. By way of example, one stalk at a time, three stalks at a time, etc.

A further object of the present invention is to provide a tie-in between the cane transfer means at the top of the container and the elevating mechanism for raising the bottom of the container whereby the top level of cane stalks will be kept in transfer engagement with the sugar cane lateral transfer means.

A still further object of the present invention is to provide a control means between the planting apron and the lateral transfer means whereby upon the apron being filled with sugar cane stalks to be planted, the apron will signal the control for the lateral transfer means to stop lateral transfer of sugar cane stalks from the container onto the planting apron until stalks presently on the apron have passed through the cane dispensing metering device and are deposited into the open cane row.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is an end elevational view with parts broken away and parts shown in section of a cane planter constructed in accordance with the present invention.

FIGURE 2 is a top plan view of a modified form of the sugar cane planter of FIGURE 1, showing the planter adapted for planting two cane rows simultaneously.

FIGURE 4 is a view similar to FIGURE 1 showing the sugar cane transfer means slid to one side to permit loading of the container with sugar cane stalks.

FIGURE 5 is an enlarged view with parts broken away and parts shown in dotted lines of the lower end of the planting apron showing the planting apron, cane dispensing metering device and lateral transfer control switch mechanism.

FIGURE 6 is a fragmentary top plan view of the planting apron showing the attachment of the cane dispensing metering means thereto.

FIGURE 7 is a side elevational view of one form of rotary tooth cane metering device employed with the present invention.

FIGURE 8 is a vertical section taken through a modified form of cane dispensing metering means.

FIGURE 9 is a hydraulic schematic of the drive systems of the present invention.

FIGURE 10 is a schematic sectional view of a cane cutting saw carried by the cane transfer means.

Figure 3:
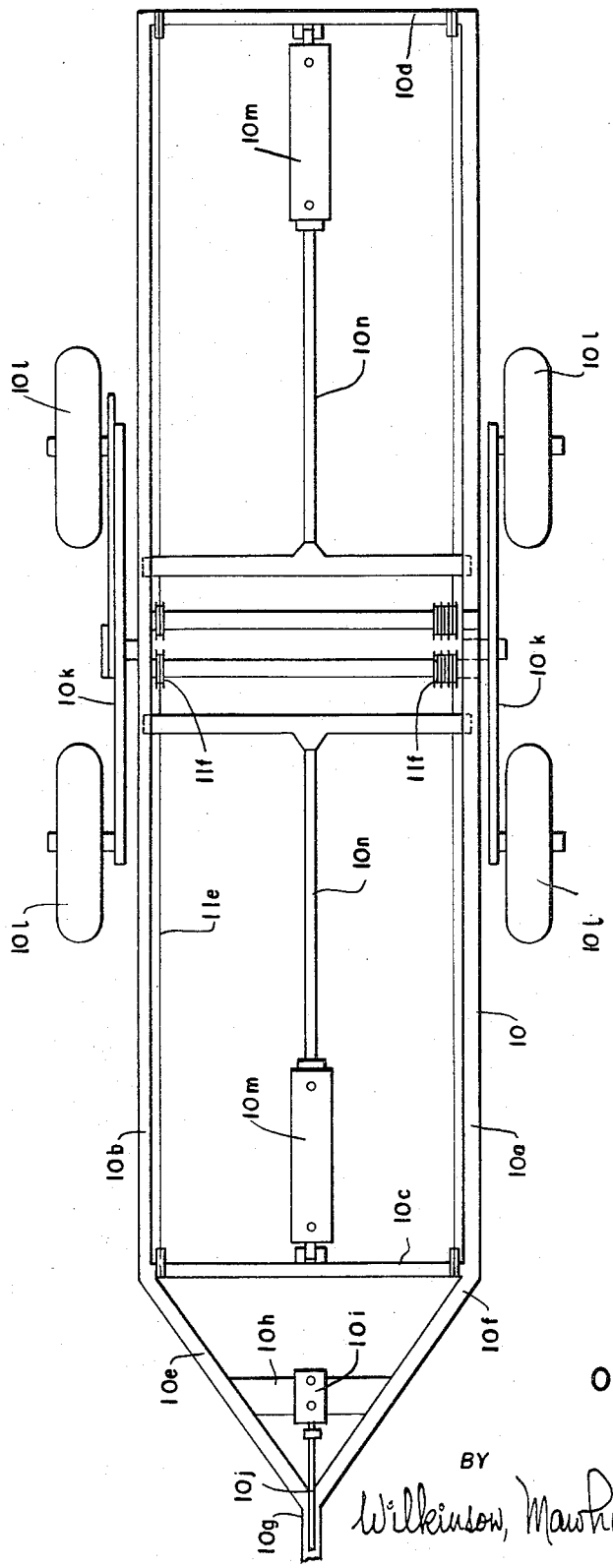
FIGURE 3 is a top plan view of the mobile vehicular frame upon which the cane planting elements are mounted for transport through a cane field.

Referring more particularly to the drawings and for the moment to FIGURE 1, 10 designates generally a vehicular frame upon which is supported a sugar cane container 11 having an open top. Positioned above the open top of the container 11 is a sugar cane lateral transfer conveyor means 12 which transfers sugar cane from the top of the container 11 depositing same upon a planting apron 13 which permits the sugar cane to come into dispensing engagement with a cane dispensing metering means 14 for deposit into a planting chute 15 for ultimate discharge into an open furrow 16 of a sugar cane row 17.

THE VEHICULAR FRAME

Referring now to FIGURE 3, the vehicular frame 10 has two longitudinal support members $10^a$ and $10^b$ joined by transverse support members $10^c$ and $10^d$. At the forward end of the frame an A frame member $10^e$ and $10^f$ converge to a draft member $10^g$. At the forward end a platform $10^h$ supports a hydraulic pump $10^i$ which is driven from a power take-off connection $10^j$ from the power take-off of the tractor which pulls the cane planter along the cane rows.

The vehicular frame is mounted upon a wheeled support $10^k$ which has wheels $10^l$ for supporting and advancing the planter along the cane rows. Hydraulic cylinders $10^m$ are secured at one end to the transverse support members $10^c$ and $10^d$. Operating rams $10^n$ control raising and lowering of cables connected to the bottom of the sugar cane stalk container, as will be described more fully hereinafter.

CONTAINER MEANS

Referring now to FIGURES 1 and 4, mounted upon the vehicular frame 10 is a sugar cane container 11 having side walls $11^a$ and $11^b$, an elevatable bottom $11^c$ and an open top $11^d$. The elevatable bottom $11^c$ has connected thereto elevating cables $11^e$ which are roved over sheaves $11^f$.

When the supply of sugar cane stalks at the top of the open end of the container $11^d$ are no longer in engagement with the top of the sugar cane pile contained within the container 11, the bottom $11^c$ is elevated to raise the cane stalks within the container in such a manner as to place the top level of the sugar cane stalks in the container in transfer engagement with the lateral transfer means 12. This amounts to a transfer of the bottom $11^c$ from the position shown in dotted lines in FIGURE 1 to the solid line position of FIGURE 1. The wall structure $11^a$ and $11^b$ may be of the solid metal wall type or foraminous metal to reduce weight.

SUGAR CANE LATERAL TRANSFER MEANS

The lateral transfer means comprises endless conveyor chains $12^a$ having cane engaging fingers or projections $12^b$ extending outwardly therefrom. The endless conveyor chains are moved about sprockets $12^c$ carried on a boom $12^d$ which is pivoted about a shaft $12^e$ carried in an inner support $12^f$ of a telescopic tube $12^g$. Lying between the two telescopic tube sections $12^f$ and $12^g$ is a buffer spring $12^h$, the loading of which is controlled by a threaded bolt $12^i$.

The spring $12^h$ regulates the pressure with which the chains $12^a$ engage the cane stalks to assure transfer engagement of the chains with the cane but not a biting or impaling engagement which could damage the cane stalk as plant cane. The spring $12^h$ within the tube $12^g$ will regulate the position of pin 26 in its slot and hence control the cane level control valve 24 as described more fully hereinafter to control raising and lowering of the bottom $11^c$ of the container 11, the valve 24 acting as a rough adjustment and the spring $12^h$ and its regulatory control screw $12^i$ acting as a vernier adjustment. This also provides overload protection for motor $12^r$.

As best seen in FIGURE 4, a guide rail $12^j$ is mounted across the top of the container 11 and has notch $12^l$ at one side and a stop lug $12^m$ at the other so that the lateral transfer means can be shifted from the cane engaging position of FIGURE 1 to the load position of FIGURE 4 whereby cane stalks may be deposited through the open end $11^d$ of the container 11.

The movement of the cane transfer means from the load position of FIGURE 4 to the cane engaging position of FIGURE 1 is effected by a cylinder and ram $12^m$, one end of which is secured to the container at $12^o$ and the other end of which is secured to the tube $12^g$ at $12^p$. The shaft $12^q$ for sprocket $12^c$ has a trunnion extension receivable into the notch $12^l$ for retaining the endless chain $12^a$ in cane engaging contact with the sugar cane stalks within the container 11, as best seen in FIGURE 4. The lower end of the tube $12^g$ is pivoted to the container 11.

The motive power for the lateral cane transfer chains $12^a$ is supplied by a hydraulic motor $12^r$ secured on a on a plate $12^s$ carried by the shaft member $12^f$. The hydraulic motor $12^r$ drives the shaft $12^e$ and is connected to the hydraulic pump $10^i$ which supplies hydraulic fluid to the motor $12^r$ through flexible rubber hydraulic lines $12^t$. In circuit between the pump $10^i$ and the motor $12^r$ is a solenoid control valve $12^u$ which is actuated by the contacts $13^e$ carried by the planting apron so that the solenoid valve $12^u$, upon opening of the contacts $13^e$, will stop flow of hydraulic fluid to the motor $12^r$ and thereby cease the feeding of cane stalks to the planting apron 13.

Cooperating with the lateral transfer of plant cane stalks which may range in length from 6 to 8 feet in a chain saw, best seen in FIGURES 2 and 10 which comprises idler sprockets 28 and $28^a$ carried to freely rotate on shafts $12^e$ and about which is carried a chain $28^c$ carrying cutting teeth $28^d$ on its outer side. A sprocket $28^e$ is in driving engagement with the inside of the chain $28^c$, mounted on a power shaft $28^f$ receiving its power from a hydraulic motor $28^g$. The motor $28^g$ is selectively driven by control valve $28^h$, see FIGURE 9. The motor $28^g$ is carried on a support member $28^i$.

The diameter of the sprockets 28, $28^a$ is 16 inches or more to assure an 8 inch depth cut into the top of the cane stalks in the container 11 all the way across the top of the container to avoid matting or entanglement of stalks between the front and rear of the container. If the stalks do not lie perfectly parallel and level for each layer, which as a practical fact they do not, it would be possible to cause a bow in a cane stalk when it is subjected to the transfer pull of two sets of double chains; however, by cutting the long stalks in half a jamming or matting of stalks being transferred is eliminated.

THE PLANTING APRON

The planting apron 13 consists of a chute $13^a$ having side walls $13^b$. This chute $13^a$ is positioned below the upper end of the container 11 and declines downwardly and outwardly to one side of the harvester, as best seen in FIGURE 1.

As best seen in FIGURE 5, the lower portion of the planting apron chute has a bottom $13^c$ which is pivoted at $13^d$ so that when a plurality of cane stalks, as shown in dotted lines in FIGURE 5, build up between the cane dispensing metering means 14 and the apron 13, the weight of these cane stalks will cause the bottom $13^c$ to rotate about the pivot $13^d$ thereby opening contacts $13^e$ to stop motion of the sugar cane lateral transfer means 12 so that there is not an overfeeding of sugar cane stalks to the planting apron. Secured to the pivoted bottom $13^c$ is a spring $13^f$ which normally biases the pivoted bottom to the dotted line position of FIGURE 5 which maintains the contacts $13^e$ in a closed condition so as not to open the power circuit to the lateral transfer conveyor 12. The spring $13^f$ is secured to the planting apron at $13^g$ and a limit slot $13^h$ in the side wall of the planting apron construction limits motion of a projection $13^i$ to limit the upper and lower movement of the pivoted bottom $13^c$.

Cooperating with the planting apron 13 is a deflection chute $13^k$ which will assure that the cane stalks being shifted laterally from the top of the container 11 are dropped upon the planting apron 13.

CANE DISPENSING METERING MEANS

At the lower end of the chute $13^a$ are static comb members $14^a$ between which are passed the teeth of a rotary comb member $14^b$ which are secured to rotate with the shaft $14^c$. The shaft $14^c$ is rotated by an endless belt $14^d$ rotated by sheaves $14^e$ mounted on $14^f$ which are driven from a belt $14^g$ which receives its power from sheave $14^h$ on shaft $14^i$. The sheave $14^h$ is driven by belt $14^l$ from sheave $14^s$ on shaft $14^t$. Sprocket $14^u$ drives chain $14^v$ from sprocket $14^w$ mounted on hub $14^x$ on wheel $10^l$, whereby the rotary combs $14^b$ will receive sugar cane stalks from the apron $13^a$ and will meter the dispensing of the sugar cane stalks at a rate proportional to the rate of advance of the planter along the cane row or at a rate less than proportional speed of the planter to provide the desired lap between heads and butts of succeeding cane stalks along the plant row.

As best seen in FIGURES 6 through 8 inclusive, the length of the rotary comb teeth $14^b$ may be increased or shortened to dispense one or more sugar cane stalks per rotation of shaft $14^c$ in the manner desired by the particular farmer operating the cane planter.

One form of elongatable rotary comb teeth is shown in FIGURE 7 in which the teeth $14^b$ are in two parts, as by way of example the part designated $14^b$ and the part designated $14^m$ in FIGURE 7, in which the part $14^m$ has an elongated slot $14^n$ and anchor bolts $14^o$ which will permit the portion $14^m$ to be adjusted outwardly from the shaft $14^c$ to either increase or decrease the effective tooth length.

Referring now to FIGURE 7, the rotary shaft $14^c$ has been replaced by a rotary square tubular member $14^p$ which is provided proximate its end portions with threaded sockets $14^q$ which receive threaded bolt members $14^r$ and lock nuts $14^s$. The effective length of this form of rotary comb member is controlled by first backing off on the locking nut $14^s$ and then through the threaded engagement of the bolt $14^r$ screwing the bolt $14^r$ into the square tubular member $14^p$ to obtain the desired length of tooth extending from the square tubular member $14^p$. The lock nut $14^s$ is then set to lock the tooth firmly in place.

THE PLANT CHUTE

Secured to be positioned beneath the planting apron 13 and the cane metering dispensing device 14 is a plant chute 15 having downwardly convergent walls $15^a$ and $15^b$ leading to an open discharge mouth $15^c$ at one end and an open feed mouth $15^d$ at the other end. This chute guides cane discharge by the cane metering means 14 to assure that the sugar cane stalks are deposited in the open top 16 of a sugar cane row 17.

CONTROL MEANS

The lateral transfer conveyor for moving stalks from the container 11 onto the planting apron 13 is effected, as shown in FIGURES 1 and 9, in which the hydraulic system is provided with a hydraulic sump 20 having a supply line 21 to the pump $10^i$. A line 22 runs from the pump $10^i$ to the solenoid operated valve $12^u$ and thence by hydraulic line 23 to hydraulic motor $12^r$ with a return line 25 back to the sump 20.

When the planting apron 13 is loaded and the pivoted floor portion $13^c$ drops down opening contacts $13^e$, the solenoid $12^u$ will cease to supply hydraulic fluid to the conveyor chain motor $12^r$. When the solenoid $12^u$ closes, blocking the fluid delivery from the pump $10^i$ driven by the tractor power take-off shaft, the pump $10^i$ is provided with a relief valve which will permit a bleed back to the sump through line 26.

Secured to the shaft $12^f$ is a projection 26 in engagement with a pivoted lever 27, which pivoted lever controls the level control valve 24 in hydraulic circuit with the cylinders and rams $10^m$ for raising and lowering the floor or bottom $11^c$ of the container to assume that the lateral transfer conveyor chains $12^b$ are engaging cane stalks for lateral displacement onto the planting apron 13.

Although I have disclosed herein the best forms of the invention known to me at this time, I reserve the right to all such modifications and changes as may come within the scope of the following claims.

What is claimed is:

1. For use with a prime-mover vehicle having a power take off shaft, a sugar cane planter comprising
    (a) a mobile vehicular frame adapted to straddle a sugar cane row and be drawn along the cane row by the prime-mover vehicle,
    (b) container means carried by the vehicular frame for containing a quantity of sugar cane stalks to be planted, said container having a bottom movable from the bottom of the container towards the top, the sugar cane stalks being removed from the top of the container,
    (c) a planting apron carried by said vehicular frame extending from the side thereof,
    (d) cane dispensing metering means carried by said apron,
    (e) sugar cane transfer means carried by said container positioned to engage sugar cane at the top of the container means and to transfer the cane stalks laterally of the container and drop them on the planting apron for discharge to an open cane row from said cane dispensing metering means, and
    (f) control means operatively associated with said planting apron, cane transfer means and the bottom of the container means so that as the cane transfer means loses contact with the top of the mass of cane stalks in the container the bottom of the container will be raised to reestablish transfer contact between cane stalks at the top of the container and said cane transfer means and that the supply of cane stalks from the container to the apron not exceed the predetermined rate of plant whereby the apron upon being overloaded will stop the cane transfer means.

2. A sugar cane planter as claimed in claim 1, wherein the planting apron has a portion of the bottom of its trough pivoted so that under an overload the pivoted portion will signal the cane transfer means to cease lateral transfer of sugar cane stalks to the apron.

3. A sugar cane planter as claimed in claim 1, wherein said cane dispensing metering means comprises a static comb means carried by the lower free end of the planting apron and a rotary comb means supported by said apron with the teeth of the rotary comb means being intermeshed with the teeth of the static comb means and the teeth of the rotary comb means being adjustable in length about the radius of rotation to pick up and dispense any predetermined number of sugar cane stalks.

4. A sugar cane planter as claimed in claim 1, wherein said sugar can transfer means are a plurality of endless chains having cane engaging fingers thereon mounted on a frame movable between a cane engaging position over the top of the cane stalk container and to a position away from the top of the container to permit loading of the container with cane stalks.

5. A sugar cane planter as claimed in claim 1, wherein said control means controls hydraulic circuitry to regulate the fluid output from a hydraulic pump carried by said vehicular frame which pump is driven from the power take off of the prime-mover and which pump is hydraulically connected to actuate the cane transfer means and to raise the bottom of the container to maintain cane stalks at the open top of the container in transfer contact with said cane transfer means.

6. A sugar cane planter as claimed in claim 1, further comprising a cane plant chute carried at the lower free end of the apron to receive the cane stalks fed from said cane dispensing metering means to drop the cane stalks in an open cane row.

7. A sugar cane planter as claimed in claim 1, wherein the rate dispensing of said cane dispensing metering means is proportional to the speed of forward travel of said vehicular frame along a plant row.

8. A sugar cane planter comprising
    (a) a container for carrying a quantity of sugar cane stalks with their axis disposed longitudinally of the cane row into which they are to be planted,
    (b) a planting apron downwardly declined from the top of the container and positioned to receive cane stalks from the top of said container,
    (c) cane transfer means positioned at the top of the container to engage the sugar cane stalks and laterally transfer the stalks from the top of the container onto said apron, and
    (d) cane dispensing metering means carried by the lower free end of said apron and being positioned to gravitationally receive cane stalks from said apron and to discharge any predetermined number of cane stalks into an open cane row.

9. A sugar cane planter as claimed in claim 8, further comprising a planting chute positioned to receive the cane stalks discharged from said cane dispensing metering means and to direct said cane stalks into an open row.

10. A sugar cane planter as claimed in claim 8, further comprising pressure regulation means associated with said cane transfer means so that the transfer pressure of said transfer means against the sugar cane stalks at the top of the container may be regulated to avoid physical damage or impaling of the cane stalks during lateral transfer.

11. A sugar cane planter as claimed in claim 8, further comprising cane severing means positioned above the container for severing the length of the sugar cane stalks in said container for a distance below the top thereof to free the sugar cane stalks from any disengagement with the cane lateral transfer means.

References Cited

UNITED STATES PATENTS

| | | | |
|---|---|---|---|
| 1,678,643 | 7/1928 | Kassebeer | 111—3 |
| 2,841,103 | 7/1958 | Arceneaux | 111—3 |
| 3,082,908 | 3/1963 | Ingham | 221—185 X |

WILLIAM W. DYER, JR., *Primary Examiner.*

W. GRAYDON ABERCROMBIE, *Examiner.*